United States Patent
Ko et al.

(10) Patent No.: US 6,703,120 B1
(45) Date of Patent: Mar. 9, 2004

(54) SILICONE ADHESIVES, ARTICLES, AND METHODS

(75) Inventors: John H. Ko, Woodbury, MN (US); Kurt C. Melancon, White Bear Lake, MN (US); Anita L. Schulz, Dellwood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/009,928

(22) PCT Filed: May 5, 1999

(86) PCT No.: PCT/US99/09945
§ 371 (c)(1),
(2), (4) Date: Apr. 11, 2002

(87) PCT Pub. No.: WO00/68336
PCT Pub. Date: Nov. 16, 2000

(51) Int. Cl.[7] .................................................. B32B 9/04
(52) U.S. Cl. ................... 428/355 R; 428/354; 428/447; 428/448; 428/66.3; 428/351; 428/401; 525/477; 525/478; 528/15; 528/35; 485/288.1; 485/288.4; 485/305.3; 485/305.4
(58) Field of Search .......................... 428/355 R, 354, 428/447, 448, 66.3, 40.1, 351, 458; 525/477, 478; 528/15, 35; 435/288.1, 288.4, 305.3, 305.4

(56) References Cited

U.S. PATENT DOCUMENTS

| | | |
|---|---|---|
| 2,500,549 A | 3/1950 | Ketay et al. |
| 2,676,182 A | 4/1954 | Daudt et al. |
| 2,814,601 A | 11/1957 | Currie et al. |
| 2,857,356 A | 10/1958 | Goodwin |
| 3,159,601 A | 12/1964 | Ashby |
| 3,159,662 A | 12/1964 | Ashby |
| 3,188,299 A | 6/1965 | Chalk |
| 3,188,300 A | 6/1965 | Chalk |
| 3,192,181 A | 6/1965 | Moore |
| 3,344,111 A | 9/1967 | Chalk |
| 3,383,356 A | 5/1968 | Nielsen |
| 3,445,420 A | 5/1969 | Kookootsedes et al. |
| 3,453,233 A | 7/1969 | Flatt |
| 3,453,234 A | 7/1969 | Kookootsedes |
| 3,516,946 A | 6/1970 | Modic |
| 3,532,649 A | 10/1970 | Smith et al. |
| 3,551,295 A | 12/1970 | Dyer |
| 3,814,730 A | 6/1974 | Karstedt |
| 3,929,704 A | 12/1975 | Horning |
| 3,965,136 A | 6/1976 | Knollmueller |
| 3,983,298 A | 9/1976 | Hahn et al. |
| 3,992,429 A | 11/1976 | Knollmueller |
| 4,016,328 A | 4/1977 | Horning |
| 4,029,629 A | 6/1977 | Jeram |
| 4,058,546 A | 11/1977 | Knollmueller |
| 4,077,993 A | 3/1978 | Knollmueller |
| 4,293,671 A | 10/1981 | Sasaki et al. |
| 4,309,520 A | 1/1982 | Blizzard |
| 4,465,805 A | 8/1984 | Blizzard et al. |
| 4,510,094 A | 4/1985 | Drahnak |
| 4,533,575 A | 8/1985 | Melancon |
| 4,584,355 A | 4/1986 | Blizzard et al. |
| 4,609,574 A | 9/1986 | Keryk et al. |
| 4,611,042 A | 9/1986 | Rivers-Farrell et al. |
| 4,736,048 A | 4/1988 | Brown et al. |
| 4,751,269 A | 6/1988 | Bonk et al. |
| 4,774,297 A | 9/1988 | Murakami et al. |
| 4,831,070 A | 5/1989 | McInally et al. |
| 4,842,902 A | 6/1989 | Brown et al. |
| 4,882,377 A | 11/1989 | Sweet et al. |
| 4,883,642 A | 11/1989 | Bisconte ...................... 422/66 |
| 4,889,753 A | 12/1989 | Brown et al. |
| 4,906,695 A | 3/1990 | Blizzard et al. |
| 4,978,696 A | 12/1990 | Clark et al. |
| 4,980,440 A | 12/1990 | Kendziorski et al. |
| 4,988,779 A | 1/1991 | Medford et al. |
| 5,034,061 A | 7/1991 | Maguire et al. |
| 5,082,706 A | 1/1992 | Tangney ...................... 428/40 |
| 5,096,981 A | 3/1992 | Traver |
| 5,100,976 A | 3/1992 | Hamada et al. |
| 5,110,882 A | 5/1992 | Hamada et al. |
| 5,120,810 A | 6/1992 | Fujiki et al. |
| 5,128,394 A | 7/1992 | Traver et al. |
| 5,169,727 A | 12/1992 | Boardman |
| 5,175,058 A | 12/1992 | Traver |
| 5,190,827 A | 3/1993 | Lin |
| 5,248,716 A | 9/1993 | Lin et al. |
| 5,248,739 A | 9/1993 | Schmidt et al. |
| 5,254,644 A | 10/1993 | Kobori et al. |
| 5,292,586 A | 3/1994 | Lin et al. |
| 5,325,654 A | 7/1994 | Juntunen et al. |
| 5,341,557 A | 8/1994 | Perlman |
| 5,346,765 A | 9/1994 | Maeda et al. |
| 5,366,809 A | 11/1994 | Schmidt et al. |
| 5,395,047 A | 3/1995 | Pendergrass, Jr. |

(List continued on next page.)

FOREIGN PATENT DOCUMENTS

| | | |
|---|---|---|
| CA | 2101708 A1 | 1/1994 |
| DE | 1 940 124 | 2/1970 |

(List continued on next page.)

OTHER PUBLICATIONS

"The Handbook of Pressure–Adhesive Technology," 2$^{nd}$ Edition, (ed. D. Satas, 1989) p. 510.

(List continued on next page.)

*Primary Examiner*—Robert Dawson
*Assistant Examiner*—Christopher Keehan

(57) ABSTRACT

The present invention provides silicone-based adhesives, preferably pressure sensitive adhesives, adhesive articles, and methods. Preferably, the articles are cover tapes for analytical receptacles, such as microtiter plates, microfluidic devices, and continuous multi-reservoir carriers, or other analytical receptacles or biosensors, for example. Typically, such analytical receptacles are used in bioanalytical applications and are designed for containing solids and fluids, including liquids, gases, powders, and gels, which may include biological samples or organic solvents, for example.

38 Claims, No Drawings

U.S. PATENT DOCUMENTS

| | | | |
|---|---|---|---|
| 5,399,614 A | 3/1995 | Lin et al. | |
| 5,443,890 A | 8/1995 | Öhman | |
| 5,447,784 A | 9/1995 | Williams et al. | |
| 5,466,532 A | 11/1995 | Wengrovius et al. | |
| 5,486,578 A | 1/1996 | Carpenter, II et al. | |
| 5,576,110 A | 11/1996 | Lin et al. | |
| 5,580,915 A | 12/1996 | Lin | |
| 5,602,214 A | 2/1997 | Lin et al. | |
| 5,612,400 A | 3/1997 | Gross et al. | |
| 5,648,136 A | 7/1997 | Bird | |
| 5,721,136 A | 2/1998 | Finney et al. | 435/287 |
| 5,729,963 A | 3/1998 | Bird | |
| 5,765,692 A | 6/1998 | Schenz | |
| 5,804,022 A | 9/1998 | Kaltenbach et al. | |
| 5,842,787 A | 12/1998 | Kopf-Sill et al. | |
| 5,846,652 A | 12/1998 | Yamashita | |

FOREIGN PATENT DOCUMENTS

| | | |
|---|---|---|
| EP | 0 253 601 A2 | 1/1988 |
| EP | 0 255 226 A2 | 2/1988 |
| EP | 0 269 454 B1 | 6/1988 |
| EP | 0 355 991 B1 | 2/1990 |
| EP | 0 360 516 A2 | 3/1990 |
| EP | 0 388 092 A2 | 9/1990 |
| EP | 0 393 426 B1 | 10/1990 |
| EP | 0 459 292 A2 | 12/1991 |
| EP | 0 506 370 B1 | 9/1992 |
| EP | 0 506 371 B1 | 9/1992 |
| EP | 0 506 372 B1 | 9/1992 |
| EP | 0 553 983 B1 | 8/1993 |
| EP | 0 581 539 A2 A3 | 2/1994 |
| GB | 2 090 845 A | 7/1982 |
| GB | 2 277 933 A | 11/1994 |
| GB | 2 287 033 A | 9/1995 |
| JP | 2086678 | 3/1990 |
| JP | 6-166861 A | 6/1994 |
| WO | WO 86/00532 A1 | 1/1986 |

OTHER PUBLICATIONS

American Society of Testing Materials, "ASTM D3330–D3330M–96, Standard Test Methods for Peel Adhesion of Pressure–Sensitive Tape at 180° Angle," *Annual Book of ASTM Standards*, pp. 371–374 (1996).

Paper Manufacturing & Finishing, Pressure Sensitive Adhesives Datasheets [online]. Dow Corning Service Center, Dow Corning Corporation [retrieved on Jan. 26, 2000]. Retrieved from the Internet: <URL:www.dowcorning.com>, 10 pages.

Satas, ed., *The Handbook of Pressure Sensitive Adhesive Technology, second edition*, Van Nostrand Reinhold, New York, Title page, publication page, and p. 511 (1989).

Product Information Sheet, "Dow Corning® Silicone Pressure Sensitive Adhesives Product and Application Information," and "Material Safety Data Sheet for Dow Corning®Q2–7566 Adhesive," Dow Corning Corporation, 18 pages (1992).

Product Information Sheet, "Information About *Syl–Off®* 4000 Catalyst," Dow Corning Corporation, Midland, MI, 1 page (undated).

Product Information Sheet, "Information About *Syl–Off©* 7615 Release Modifier," Dow Corning Corporation, Midland, MI, 1 page (undated).

Product Information Sheet, Information About *Syl–Off®* 7678 Crosslinker, Dow Corning Corporation, Midland, MI, 1 page (undated).

Product Information Sheet, "SYLGARD® 527 Silicone dielectric gel," Dow Corning Corporation, Midland, MI, 2 pages (Jun. 15, 1998).

Szycher, ed., *High Performance Biomaterials, A Comprehensive Guide to Medical and Pharmaceutical Applications*, Technomic Publishing, Title Page and table of contents, 4 pages (1991).

SILICONE ADHESIVES, ARTICLES, AND METHODS

The present application is a U.S. National Stage Application of PCT/US99/09945, filed May 5, 1999.

FIELD OF THE INVENTION

The invention relates to silicone adhesives, articles, and methods of making and using. The adhesives are particularly useful on articles such as cover tapes for analytical receptacles, such as microtiter plates, microfluidic devices, discrete or continuous multi-reservoir carriers, or other analytical receptacles, particularly those that are designed for holding a variety of liquids, in bioanalytical applications, for example.

BACKGROUND

Microtiter plates are well known for use in handling liquid materials in bioanalytical assays for multiple, rapid, low-volume analysis. A typical screening technique combines an assay plate, having multiple depressions or wells, with liquid handling hardware to provide a rapid, automated system of analysis. In a current, standard analytical system, each assay plate accommodates 96 wells, each well being addressable by suitably programmed hardware. The capacity of each of the 96 wells is about 0.2 milliliter (ml) to about 0.4 ml. Smaller capacity wells lead to assay plates that accommodate a larger number of samples. For example, assay plates containing 1536 wells, each with a capacity of less tan 5 microliters ($\mu$l) are known. These plates, with increased sampling capability, have demonstrated usefulness in a variety of assays, including enzyme assays, receptor-ligand assays, and even cell based assays. The increased number of sample wells, per assay plate, demands increased precision of the hardware associated with analysis using these assay plates.

Liquid handling for bioanalytical applications, using assay plates of either the 96-well, 384-well, or the 1536-well variety, may be viewed as a batch process with rate limitation due to the loading and positioning of the assay tray. Possible improvement in the rate of sample analysis results from the use of a continuous strip of material having sample wells molded along its length. U.S. Pat. No. 4,883,642 (Bisconte) suggests such a strip or tape. The patent teaches a continuous ribbon, which may be either smooth or suitably molded to incorporate a plurality of micro-wells. Fixed biological sample analysis uses smooth versions of the continuous ribbons while micro-well ribbons find use for analyzing living biological samples. Two tracks, positioned along opposite edges of the ribbon, provide addressable means for moving and positioning the ribbon in a selected, precise location with adjustment accurate to 10 micrometers ($\mu$m). The tracks may be coded using magnetic, optical, or computer methods, for example, which allow manipulation and positioning of the ribbon. A dosage syringe type of device, positioned using a step by step motor, distributes biological samples in the micro-wells.

This continuous multi-reservoir carrier is useful in the automated analysis of biological samples, such as histological sections. Protection of the samples, whether applied to a smooth ribbon or contained in micro-wells may use a self-adhesive film. The self-adhesive film covers the smooth film surface or seals the openings to the individual micro-wells. It may be permeable or impermeable to air.

U.S. Pat No. 5,721,136 (Finney et al.) teaches the use of a multiplayer sheet having a silicone adhesive thereon for use on vessels for biochemical reactions. One layer provides strength and integrity for the film. The second layer is a thick, in the range of about 2 mils. To about 40 mils (50 $\mu$m to 1016 $\mu$m), deformable material with a very low surface. The elastic nature of the second layer results in good seal when clamped down during thermal cycling. The rubbery materials also provide a very low level of adhesion. The peel force of the sheet from a Polypropylene surface is reported to be in the range of 1.1 N/dm to 5 N/dm (0.1 oz/in to 4.5 oz/in). Although a low tack adhesive is desirable to prevent the tape from sticking to rubber gloves commonly used in biological research, when applied to a microplate, for example, low adhesion of thick, elastic adhesive tapes is likely to cause a high evaporation rate and increase the incidence of cross-contamination during storage and handling.

To increase cohesive strength and reduce contamination due to residual adhesive, silicone may be cured or crosslinked by catalysts such as peroxide or metallic salts at elevated temperatures. For example, benzoyl peroxide requires a cure temperature of more than 150° C. for the catalyst to be functional. Consequently, a backing with low melting or softening point, such as a polyethylene film, may be overly stretched or distorted dimensionally during curing. To prepare a curable silicone tape, one common practice is to coat curable silicones on a release liner consisting of a fluorosilicone coating and PET (polyethylene terephthalate) backing. The tape is then laminated with the backings of low melting or softening point temperatures. Since release liners arm commonly used to process and to protect silicone adhesive surfaces, it is important that the release force to separate the tape from the release liner be kept at a low level to minimize distortion of the tape backing, particularly when the release liner is removed during an automatic process.

U.S. Pat. No. 5,082,706 (Tangney) describes a silicone PSA/fluorosilicone release laminate having a release force of less than 7.7 N/dm (7 oz/in) from the fluorosilicone release layer and a peel adhesion of at least 46.4 N/dm (42.2 oz/in). This adhesive includes a tackifying resin (often referred to as an MQ resin) containing two structural units, one of which is $R_3SiO_{1/2}$ (often designated as M) and the other $SiO_{4/2}$ (often designated as Q). As discussed in The Handbook of Pressure-Adhesive Technology, $2^{nd}$ Edition, (ed. D. Satas, 1989) p. 510, the peel adhesion of silicone pressure sensitive adhesives can be controlled by controlling the amount of tackifying resin. For example, increasing the amount of tackifying resin increases the peel adhesion; however, there is typically a point at which the peel adhesion maximizes. Thus, increasing the amount of tackifying resin beyond this point can cause peel adhesion to decrease.

SUMMARY OF THE INVENTION

What is needed are adhesives and adhesive articles, particularly cover tapes for analytical receptacles, that provide an effective peel strength from the materials that typically form analytical receptacles yet good release from a release liner and preferably sufficiently low tack as to be suitable for use with analytical receptacles. Such adhesives would be especially desirable if they are substantially resistant to liquids, particularly organic solvents such as dimethyl sulfoxide that are often used in bioanalytical applications.

The present invention provides adhesives, preferably pressure sensitive adhesives (PSAs), adhesive articles, and methods. Preferably, the articles are cover tapes for analytical receptacles, such as microtiter plates, microfluidic devices, and continuous multi-reservoir carriers, or other analytical receptacles or biosensors, for example. Typically, such analytical receptacles are used in bioanalytical applications and are designed for containing solids and fluids, including liquids, gases, powders, and gels, which may include biological samples or organic solvents, for example.

In preferred embodiments, cover tapes for such analytical receptacles provide a sealing membrane so that each reservoir, such as a well or channel, for example, is part of a sealed enclosure to retain the contents and/or reduce evaporation and contamination of the contents of the receptacle. Preferred cover tapes have sufficient transparency to allow for photometric analysis and/or visual inspection and are substantially resistant to solvents commonly used in bioanalytical applications, such as dimethyl sulfoxide (DMSO), water, acetonitrile/water, methanol, ethanol, or mixtures thereof, for example. As used herein, a substantially solvent-resistant cover tape, and particularly adhesive, is one that does not substantially swell or dissolve in the solvent used in the particular application and does maintain sufficient adhesion to the analytical receptacle.

In one embodiment, the present invention provides a silicone adhesive, preferably, a pressure sensitive adhesive, which is prepared from components including: (a) a polydiorganosiloxane having the general formula $R^1R_2SiO(R_2SiO)_nSiR_2R^1$ and a number average molecular weight of at least 20,000, wherein each R is independently a monovalent hydrocarbon group, each $R^1$ is independently an alkenyl group, and n is an integer, (b) a polydiorganosiloxane having the general formula $R^1R_2SiO(R_2SiO)_m(R^1RSiO)_nSiR_2R^1$ and a number average molecular weight of less than 20,000, wherein each R and $R^1$ is independently a monovalent hydrocarbon group, at least two $R^1$ groups are alkenyl groups, and m and n are integers the sum of which provide an alkenyl equivalent weight of about 250 to about 10,000; (c) an organopolysiloxane MQ resin which contains $(R^2)_3SiO_{1/2}$ units and $SiO_2$ units in a molar ratio in the range of 0.6:1 to 1:1, wherein each $R^2$ is independently selected from the group of alkyl groups, alkenyl groups, or hydroxyl groups, wherein at least 95 mole percent of all $R^2$ groups are methyl groups; (d) an organohydrogenpolysiloxane free of aliphatic unsaturation having an average of at least 2 silicon-bonded hydrogen atoms in each molecule, in a quantity sufficient to provide from 1 to 40 silicon-bonded hydrogen atoms per alkenyl group in components (a) through (c); and (e) a Group VIIIB containing catalyst in a quantity sufficient to provide 0.1 to 1,000 weight parts Group VIIIB metal for each one million weight parts of the combined quantity of components (a) through (d). Methods of making and methods of using such adhesives are also provided.

In another embodiment, the present invention provides an adhesive article that includes a substrate having disposed on at least one major surface a silicone-based adhesive, preferably a pressure sensitive adhesive, of the above formula. Adhesive articles include tapes, labels, and other sheeting useful in various formats including medical, graphics, and analytical applications.

In yet another embodiment, the present invention provides an analytical receptacle that includes a surface, preferably having at least one reservoir therein, and a cover tape adhered to the surface; wherein the cover tape includes a backing and an adhesive of the formula above disposed on at least one major surface of the backing and in contact with the receptacle surface.

In still another embodiment, the present invention provides an analytical receptacle that includes a surface comprising polypropylene, polystyrene, or combination thereof, and a cover tape adhered to the surface; wherein the cover tape includes a backing and an adhesive disposed on at least one major surface of the backing and in contact with the receptacle surface, wherein the adhesive is prepared from components including: (a) a polydiorganosiloxane having the general formula $R^1R_2SiO(R_2SiO)_nSiR_2R^1$ wherein each R is independently a monovalent hydrocarbon group, each $R^1$ is independently an alkenyl group and n is an integer, (b) an organopolysiloxane MQ resin which contains $(R^2)_3SiO_{1/2}$ units and $SiO_2$ units in a molar ratio in the range of 0.6:1 to 1:1, wherein each $R^2$ is independently selected from the group of alkyl groups, alkenyl groups, or hydroxyl groups, wherein at least 95 mole percent of all $R^2$ groups are methyl groups; (c) an organohydrogenpolysiloxane free of aliphatic unsaturation having an average of at least 2 silicon-bonded hydrogen atoms in each molecule, in a quantity sufficient to provide from 1 to 40 silicon-bonded hydrogen atoms per alkenyl group in component (a) and component (b) if present; and (d) a Group VIIIB-containing catalyst in a quantity sufficient to provide 0.1 to 1,000 weight parts Group VIIIB metal for each one million weight parts of the combined quantity of components (a) through (c).

In yet another embodiment, the present invention provides an analytical receptacle that includes a surface and a cover tape adhered to the surface; wherein the cover tape includes a backing and an adhesive disposed on at least one major surface of the backing and in contact with the receptacle surface, wherein the adhesive is prepared from components including: (a) a polydiorganosiloxane having the general formula $R^1R_2SiO(R_2SiO)_nSiR_2R^1$ wherein each R is independently a monovalent hydrocarbon group, each $R^1$ is independently an alkenyl group and n is an integer, (b) an organopolysiloxane MQ resin which contains $(R^2)_3SiO_{1/2}$ units and $SiO_2$ units in a molar ratio in the range of 0.6:1 to 1:1, wherein each $R^2$ is independently selected from the group of alkyl groups, alkenyl groups, or hydroxyl groups, wherein at least 95 mole percent of all $R^2$ groups are methyl groups; (c) an organohydrogenpolysiloxane free of aliphatic unsaturation having an average of at least 2 silicon-bonded hydrogen atoms in each molecule, in a quantity sufficient to provide from 1 to 40 silicon-bonded hydrogen atoms per alkenyl group in component (a) and component (b) if present; and (d) a Group VIIIB-containing catalyst in a quantity sufficient to provide 0.1 to 1,000 weight parts Group VIIIB metal for each one minion weight parts of the combined quantity of components (a) through (c); wherein the adhesive when disposed on a fluorosilicone-coated polyethylene terephthalate release liner and a propylene/ethylene copolymer backing at a coating weight of 0.8 grams/154.8 $cm^2$ to form a laminate, and when adhered to a glass plate, displays a 180° release force of no greater than about 20 N/dm when measured at 30.5 cm/minute and room temperature.

The analytical receptacle can be in the form of a substantially continuous tape or it can be in discrete shapes and sizes, preferably with one or more reservoirs. For example, the analytical receptacle can be in the form of a microtiter plate, a microfluidic device comprising a substrate and one or more channels therein, or a substantially continuous polymeric strip (i.e., tape) comprising a plurality of reservoirs at predetermined intervals (preferably, uniformly spaced) along its length Thus, the reservoir(s) can be in a wide variety of shapes and sizes. Preferably, they form wells or channels.

The adhesive of the present invention can form a pattern on the substrate (e.g., backing of a cover tape) or it can form a continuous layer on at least one major surface thereof. It is preferably a pressure sensitive adhesive, which unlike a heat activated adhesive, typically uses pressure to engage adhesion and does not require the use of a heating device. Certain preferred tapes of the present invention can also be conveniently repositioned to different locations or repositioned to the same location for resealing purposes if desired.

DETAILED DESCRIPTION OF PREFERRED EMBODIMENTS

The present invention provides silicone-based adhesives, preferably, pressure sensitive adhesives, articles on which such adhesives are disposed (e.g., tapes), and methods of making and using such adhesives and articles. One particularly preferred article is a cover tape for an analytical receptacle. As used herein, analytical receptacles are devices that receive a sample, reagent, or solvent. Preferably, the device is configured to receive a volume of sample, reagent, or solvent, most preferably a microvolume. Such preferred configurations include one or more reservoirs. Examples include assay plate arrays (e.g., microtiter plates) and discrete or continuous (e.g., strip or tape) structures containing a plurality of wells, channels, or other reservoirs. Preferred analytical receptacles, without further modification, provide an open system of one or more reservoirs (e.g., wells or channels) to which fluids may be added directly. Open systems require careful control of evaporation and cross-contamination, which limits their practical applications. Thus, cover tapes are desirable as they result in closed systems that do not necessarily require specialized sample transport and containment.

A cover tape is applied along the length and width of an analytical receptacle to seal the receptacle, preferably the reservoir(s) of the receptacle. Preferably, this results in producing individually sealed enclosures. Materials may be injected into or extracted from the closed reservoirs, through the cover tape, using suitable hypodermic-type needles, for example, if so desired Preferred analytical receptacles can include one or more reservoirs. They can be substantially continuous or discrete (i.e., noncontinuous) structures. For example, an analytical receptacle can be in the form of a microtiter plate that is conventionally used in bioanalytical methods. Alternatively, it can be a microfluidic device or continuous multi-reservoir carrier, for example, which can be cut into discrete (noncontinuous) pieces, if desired. Preferably, conventional analytical receptacles are made of polyolefins, polystyrene, and/or polycarbonate, for example, and more preferably, polypropylene and/or polystyrene.

A cover tape of the present invention, which acts as a sealing membrane, includes a silicone adhesive, preferably, a pressure sensitive silicone adhesive, disposed on a backing. Preferably, the backing is made of a transparent material to allow for photometric analysis and/or visual inspection. A cover tape of the present invention preferably adheres well to materials of which conventional analytical receptacles arc made (preferably polyolefins, polystyrene, polycarbonate, or combinations thereof, and more preferably, polypropylene, polystyrene, or combinations thereof) and is preferably repositionable (i.e., the adhesive permits repeated cycles in which materials are alternatively bonded thereto and removed therefrom, while the adhesive is permanently retained on the backing of the adhesive article), but does not allow cross-contamination of sample materials in the individual reservoirs. Preferably, the cover tape maintains adhesion during high and low temperature storage (e.g., about $-80°$ C. to about $200°$ C.) while providing an effective seal against sample evaporation (e.g., less than 5% loss within 24 hours as used in a analytical quantitative analysis setting).

Suitable cover tapes of the present invention allow for puncture by needles, such as stainless steel needles, or plastic sampling pipette tips, for example, although cover tapes that resist puncture can also be used. These puncture sites may or may not reclose. The ability to be punctured and reclosed is typically controlled by the choice of backing material and/or thickness of the adhesive (e.g., a 0.01 cm thick adhesive layer may flow sufficiently to reclose a puncture site).

Because use of the cover tape can expose the adhesive to fluid contents of a reservoir, the choice of adhesive is of particular importance. Thus, it is important that the cover tape, and particularly the adhesive composition, does not substantially dissolve or otherwise react with solvents, such as dimethyl sulfoxide (DMSO) and acetonitrile/water, used commonly in bioanalytical research. Thus, preferred adhesives are substantially resistant to a wide variety of solvents, such as DMSO, water, acetonitrile/water, methanol, ethanol, or similar polar solvents, as well as mixtures thereof. That is, preferred adhesives do not substantially swell or dissolve in the solvent used in the particular application while they maintain sufficient adhesion to the analytical receptacle.

Furthermore, preferred adhesives are pressure-sensitive adhesives with sufficient cohesive strength that they leave little or no residue on the analytical receptacles or the needles or pipette tips after withdrawal from the puncture hole in the cover tape. This adhesive also preferably exhibits low tack, which serves to reduce adhesion of the cover tape to commonly used rubber gloves made from latex or nitrile rubber (e.g., no greater than about 10 N/dm peel force).

Preferred adhesives also are substantially biocompatible (i.e., substantially physiologically inert). As used herein, a "biocompatible" material is one that does not generally cause significant adverse reactions (e.g., toxic or antigenic responses) when in contact with biological fluids and/or tissues, such as tissue death, tumor formation, allergic reaction, inflammatory reaction, or blood clotting, for example.

The adhesives of the present invention include silicones, which typically have excellent thermal and oxidative stability and a very broad service temperature range (i.e., a temperature range in which the adhesive is useful) of about $-80°$ C. to about $200°$ C. Silicone is also generally inert to a wide variety of polar chemicals and solvents, for example, water, methanol, ethanol, acetonitrile/water, and DMSO commonly used in bioanalytical testing. Furthermore, silicones are substantially biocompatible and are used in various medical devices. These properties make them excellent adhesives for use in, for example, cover tapes for analytical receptacles that are used in bioanalytical applications. However not all silicone adhesives in combination with all backings have the appropriate balance of properties (e.g., peel force, release force, and tack).

A silicone adhesive laminate disclosed in U.S. Pat. No. 5,082,706 (Tangney) includes an addition-cured silicone pressure sensitive adhesive on an addition-cured fluorosilicone release coating. When thin backings are employed in adhesive article constructions, it is desirable that upon separating the adhesive article (e.g., cover tape) from the release liner, release be sufficiently low that little if any permanent deformation of the backing occur. Thin backings (e.g., less than about 0.005 cm thick) and/or backings having low flexural modulus (e.g., polyolefins), deform easily. Thus, release forces required to separate adhesive articles based on such backings need to be very low to avoid inducing permanent deformation or curl in the adhesive article.

Although the release force needed to separate the adhesive from the fluorosilicone release coating of U.S. Pat. No. 5,082,706 (Tangney), after it is cast onto and cured in contact with the release coating, is reported to have a value of less than 200 grams per inch (7.7 N/dm), while at the same time displaying stable subsequent adhesiveness (46.4 N/dm from stainless steel) and stable subsequent tack, commercially available materials do not generally display sufficiently low release forces for many applications. For example, Dow Coming 7657 silicone adhesive displays a release force from a Rexam CLPET-6J/000 transfer liner (fluorosilicone coating on a polyethylene terephthalate backing available from Rexam Release Corp., Bedford, Ill.) of 7.1 N/dm (see Example 1 for curing conditions). Although this is suitable for some applications, it is not typically suitable for transfer of the adhesive to very thin and/or fragile backings or in automated systems in which the release liner is removed. Thus, compositions providing lower release (e.g., no greater than about 5 N/dm) are particularly desirable for such applications.

The silicone adhesive of U.S. Pat. No. 5,082,706 is prepared from the following components: (a) a polydiorganosiloxane having the general formula $R^1R^2SiO(R_2SiO)_n SiR_2R^1$ wherein each R is independently a monovalent hydrocarbon group, each $R^1$ is independently an alkenyl group and n is an integer, (b) an organopolysiloxane (often designated as an MQ resin) which contains $(R^2)_3SiO_{1/2}$ units (often designated as M units) and $SiO_2$ units (often designated as Q units) in a molar ratio in the range of 0.6:1 to 0.9:1, wherein each $R^2$ is independently selected from the group of alkyl groups, alkenyl groups, or hydroxyl groups, wherein at least 95 mole percent of all $R^2$ groups are methyl groups; (c) an organohydrogenpolysiloxane free of aliphatic unsaturation having an average of at least 2 silicon-bonded hydrogen atoms in each molecule, in a quantity sufficient to provide from 1 to 40 silicon-bonded hydrogen atoms per alkenyl group in component (a) and component (b) if present; and (d) a platinum-containing catalyst in a quantity sufficient to provide 0.1 to 1,000 weight parts platinum for each one million weight parts of the combined quantity of components (a) through (c).

For certain embodiments of the present invention, similar and preferred adhesives can be used wherein: the hydrocarbon groups of the above formula can be alkyl and alkenyl groups, etc., up to, for example, groups containing 10 carbon atoms; the alkyl groups can be methyl, ethyl, propyl, hexyl, etc., up to, for example, groups containing 10 carbon atoms; the alkenyl groups can be vinyl, propenyl, hexenyl, etc., up to, for example, groups containing 10 carbon atoms; the molar ratio of M to Q units in the MQ resin is in the range of 0.6:1 to 1:1; and a Group VIIIB-containing metal catalyst.

Embodiments of the silicone adhesive of U.S. Pat. No. 5,082,706 that contain higher levels of the MQ resin typically display lower release values from the fluorosilicone liner, without significantly detrimentally affecting the peel values from other substrates (generally, polyolefins, polystyrene, polycarbonate, for example, and preferably, polypropylene and polystyrene).

Preferably, the level of MQ resin (and other components of the adhesives described herein) can be adjusted to provide an adhesive, which when disposed on a fluorosilicone-coated polyethylene terephthalate release liner and a ethylene/propylene copolymer backing at a coating weight of 0.8 grams/154.8 cm² to form a laminate, and when the laminate is adhered to a glass plate, displays a 180° C. release force of no greater than about 20 N/dm, more preferably, no greater than about 15 N/dm, even more preferably, no greater than about 10 N/dm, and most preferably, no greater than about 5 N/dm, when measured at 30.5 cm/minute and room temperature (about 25° C. to about 30° C.). Preferably, the level of MQ resin (and other components of the adhesives described herein) can also be adjusted to provide an adhesive, which when disposed on a ethylene/propylene copolymer backing at a coating weight of 0.8 grams/154.8 cm² and adhered to a polypropylene plate, displays a 180 peel force of at least about 5 N/dm, more preferably, at least about 10 N/dm, and most preferably, at least about 15 N/dm, when measured at 30.5 cm/minute and room temperature (about 25° C. to about 30° C.). Preferably, the peel force is no greater than about 50 N/dm.

Suitable types and amounts of the various adhesive components described above are those that are disclosed in U.S. Pat. No. 5,082,706 (Tangney). Typically, the amount of MQ resin (i.e., one in which $R^2$ is an alkyl group) needed to achieve desired levels of release and peel forces will depend on the amount of the polydiorganosiloxane having the general formula $R^1R_2SiO(R_2SiO)_nSiR_2R^1$. Preferably, at least about 50 weight parts MQ resin and no greater than about 70 weight parts MQ resin is used to achieve the desired levels of peel and release forces, when the total weight parts (i.e., parts by weight) of MQ resin plus polydiorganosiloxane having the general formula $R^1R_2SiO (R_2SiO)_nSiR_2R^1$ equals 100 parts.

Alternatively to, or in addition to, increasing the level of MQ resin in the silicone adhesive of U.S. Pat. No. 5,082,706 to decrease the level of release force, a low molecular weight vinyl-substituted siloxane can be added to the composition. That is, the polydiorganosiloxane described above is actually present as a high molecular weight component and a low molecular weight component in these prefered embodiments of the adhesive. This low molecular weight component can be added as a component of a commercially available release modifier (e.g., Dow Corning SYL-OFF 7615 release modifier or General Electric Silicones SL-6030) typically used to increase release. Thus, the use of this material to decrease the release force is unexpected, particularly without significantly adversely affecting the peel force.

Such silicone pressure sensitive adhesives are prepared from the following components: (a) a polydiorganosiloxane having the general formula $R^1R_2SiO(R_2SiO)_nSiR_2R^1$ and a number average molecular weight of at least 20,000, wherein each R is independently a monovalent hydrocarbon group (such as alkyl groups, alkenyl groups, etc., up to, for example, groups containing 10 carbon atoms), each $R^1$ is independently an alkenyl group (such as vinyl, propenyl, hexenyl, etc., up to, for example, groups containing 10 carbon atoms), and n is an integer, (b) a polydiorganosiloxane having the general formula $R^1R_2SiO(R_2SiO)_m (R^1RSiO)_nSiR_2R^1$ and a number average molecular weight of less than 20,000, wherein each R and $R^1$ is independently a monovalent hydrocarbon group (such as alkyl groups, alkenyl groups, etc. up to, for example, groups containing 10 carbon atoms), at least two $R^1$ groups are alkenyl groups (such as vinyl, propenyl, hexenyl, etc., up to, for example, groups containing 10 carbon atoms), and m and n are integers the sum of which provide an alkenyl equivalent weight of about 250 to about 10,000; (c) an organopolysiloxane (designated as an MQ resin) which contains $(R^2)_3 SiO_{1/2}$ units (designated as M units) and $SiO_2$ units (designated as Q units) in a molar ratio in the range of 0.6:1 to 1:1, wherein $R^2$ is selected from the group of alkyl (such as methyl, ethyl, propyl, hexyl, etc., up to, for example, groups containing 10 carbon atoms), alkenyl (such as vinyl, propenyl, hexenyl, etc., up to, for example, groups containing 10 carbon atoms), or hydroxyl groups, wherein at least 95 mole percent of all $R^2$ groups are methyl groups; (d) an organohydrogenpolysiloxane free of aliphatic unsaturation having an average of at least 2 silicon-bonded hydrogen atoms in each molecule, in a quantity sufficient to provide from 1 to 40 silicon-bonded hydrogen atoms per alkenyl group in components (a) through (c); and (e) a Group VIIB-containing catalyst in a quantity sufficient to provide 0.1 to 1,000 weight parts Group VIIIB metal for each one million weight parts of the combined quantity of components (a) through (d). Preferably, such compositions include both nonfunctional and functional MQ resins, particularly alkenyl-functional MQ resins.

Suitable polydiorganosiloxanes having the general formula $R^1R_2SiO(R_2SiO)_nSiR_2R^1$ and a number average molecular weight of at least 20,000 are commercially available from sources such as Gelest Inc., Tullytown, Pa. Examples are disclosed in U.S. Pat. No. 5,082,706 (Tangney). For particularly preferred embodiments, the molecular weight is preferably at least about 50,000, more preferably, at least about 100,000, and most preferably, at least about 250,000.

Suitable polydiorganosiloxane of the general formula $R^1R_2SiO(R_2SiO)_m(R^1RSiO)_nSiR_2R^1$ and a number average molecular weight of less than 20,000 are commercially available from sources such as Gelest Inc. Preferred such materials have an alkenyl equivalent weight (as a result of the choice of m and n) of about 250 to about 10,000, more preferably, about 250 to about 5000, and most preferably, about 250 to about 2000.

The high molecular weight polydiorganosiloxane component (i.e., having a number average molecular weight of at least 20,000) is preferably present in the adhesive compositions in an amount of at least about 50 weight parts and no greater than about 95 weight pails, and the low molecular weight polydiorganosiloxane component (i.e., having a number average molecular weight of less than 20,000) is preferably present in the adhesive compositions in an amount of at least about 5 weight parts and no greater than about 50 weight parts, based on the total parts by weight of both the high and low molecular weight polydiorganosiloxanes.

Suitable functional and nonfunctional MQ organopolysiloxane resins are commercially available from sources such as General Electric Co, Silicone Resins Division, Waterford, N.Y.; PCR, Inc., Gainesville, Fla., and Rhone-Poulenc, Latex and Specialty Polymers, Rock Hill, S.C. Examples are disclosed in U.S. Pat. No. 5,082,706 (Tangney). Such resins are generally supplied in organic solvent and may be employed in the adhesives of the present invention as received. Typically, the amount of an MQ resin needed to achieve desired levels of release and peel forces will depend on the total amount of the high and low molecular weight polydiorganosiloxanes. The amounts of each of the components of the adhesives of the present invention are preferably chosen to provide the desired levels of peel and release forces described above. Preferably, at least about 50 weight parts MQ resin and no greater than about 70 weight parts MQ resin is used to achieve the desired level of release force, when the total weight parts (i.e., parts by weight) of MQ resin plus polydiorganosiloxanes (both high and low molecular weights) equals 100 parts.

Suitable organohydrogenpolysiloxane free of aliphatic unsaturation having an average of at least 2 silicon-bonded hydrogen atoms in each molecule are commercially available from sources such as Dow Coming, Midland, Mich. and General Electric Silicones, Waterford, N.Y. Examples are disclosed in U.S. Pat. No. 5,082,706 (Tangney).

Such silicone adhesives are prepared by addition-cure chemistry and typically involve the use of a platinum or other Group VIIIB (i.e., Groups 8, 9, and 10) metal catalysts, typically, hydrosilation catalysts, to effect the curing of the silicone adhesive. Reported advantages of addition-cured silicone adhesives include reduced viscosity as compared to silicone adhesives prepared via condensation chemistry, higher solids content, stable viscosity with respect to time, and lower temperature cure Methods of preparation are disclosed in U.S. Pat. No. 5,082,706 (Tangney).

The adhesive composition may include other additives to adjust for desired properties. For example, pigment may be added as colorant; conductive compounds may be added to make an adhesive surface electrically conductive or antistatic, antioxidants and bacteriastatic agents may be added, light absorbers may be added to block certain wavelengths from passing through the article; or inhibitors may be added to extend adhesive pot life, thus avoiding premature gelation of the adhesive coating solution. Examples of such additives are commercially available from various sources and are disclosed in U.S. Pat. No. 5,082,706 (Tangney), as are desired amounts.

The adhesive composition can be applied to appropriate release liners by a wide range of processes, including, solution coating, solution spraying, etc., to make adhesive/release liner laminates, preferably at a coating weight of about 0.2 grams/154.2 $cm^2$ to about 2.4 grams/154.2 $cm^2$. Typically, it is applied to a thermally resistant substrate, such as polyethylene terephthalate coated with a fluorosilicone release material (such as that disclosed in U.S. Pat. No. 5,082,706 and commercially available from Rexam Release, Bedford Park, Ill.) to form an adhesive/release liner laminate. The adhesive transfer tape is then laminated to a desired substrate, such as biaxially oriented polyethylene or high density polyethylene, to form an adhesive tape, particularly a cover tape for an analytical receptacle. For evaluation of the release force of adhesives of the present invention, a release liner that releases Dow Coming 7657 silicone adhesive with a release force of less than about 10 N/dm is desired under the conditions described herein.

Conventional cover tapes for microtiter plates include an adhesive layer and a backing such as aluminum (Al) foil or polyethylene terephthalate (PET). Aluminum foil backings are less desirable because they are not transparent. PET tape backings have high mechanical strength and resist puncture by all but the hardest, sharpest needles. A plastic pipette tip, for example, requires high force to break through a very thin (approximately 1 mil or 25 $\mu$m) PET backing.

Suitable backings for use in the cover tapes of the present invention allow for puncture by needles or plastic sampling pipette tips, for example. Such puncture sites may or may not reclose (i.e., reseal). Alternatively, suitable backings that resist puncture can also be used. Preferably, the backing will puncture without splitting. The backings can be transparent, translucent, or opaque. Preferably, the backing is transparent. Transparency facilitates chemical analysis conducted by any one of several methods of photometric analysis including, for example, ultraviolet, visible, and fluorometric analysis.

The backing can include a wide range of substrate materials, examples being polymer films such as polyethylene, polyethylene terephthalate (PET), biaxially oriented polypropylene (BOPP), and metallocenepolymerized poly(alpha-olefin) copolymers. These backing materials are generally resistant to solvents commonly used in bioanalytical applications, as discussed above with respect to the adhesives. They can resist puncture or not, although if they are punctured, the puncture site does not reclose. Backings that allow for reclosure of the puncture site are also possible.

The analytical receptacles to which the cover tapes can be applied include a wide variety of articles. Preferably, the analytical receptacles include at least one surface having one or more reservoirs therein. For example, a suitable analytical receptacle to which a cover tape of the present invention can be applied includes a microtiter plate, which is typically a plastic plate containing a number of small flat-bottomed wells arranged in rows. Another example is a tape that includes a substrate coated with a gel having a plurality of separate adjacent tracks thereon, as disclosed in U.S. Pat. No. 3,551,295 (Dyer).

Other analytical receptacles include microfluidic devices that include a substrate and one or more channels therein. Such a structure, which includes a body structure and at least one microscale channel disposed therein, is disclosed in U.S. Pat. No. 5,842,787 (Kopf-Sill et al.). Yet another such structure, which has a groove recessed in a flat substrate and defines a microfluidic channel system, is disclosed in U.S. Pat. No. 5,443,890 (Ohman). Yet another such structure, which includes a substrate with microstructures fabricated therein, is disclosed in U.S. Pat. No. 5,804,022 (Kaltenbach et al.).

Another type of analytical receptacle includes a substantially continuous polymeric strip formed to have wall portions defining a series of identical reservoirs at predetermined, preferably, uniformly spaced, intervals along its length, which reservoirs can have a variety of shapes. For example, the reservoirs may compose rectangular or generally "I" or "T" shapes in the plane of the strip, and may have flat or rounded bottoms as desired. Such receptacles are disclosed, for example, in U.S. Pat. No. 4,883,642 (Bisconte). Others are disclosed in U.S. Pat. No. 5,729,963 (Bird), which are designed for carrying electrical parts, but can be modified for use as analytical receptacles.

These analytical receptacles can be formed from a variety of materials, including, polyethylene, polystyrene, polypropylene, polycarbonate, which can be carbon-black or $TiO_2$ filled, transparent, translucent, or opaque.

EXPERIMENTAL

Objects and advantages of this invention are further illustrated by the following examples, but the particular materials and amounts thereof recited in these examples, as well as other conditions and details, should not be construed to unduly limit this invention.

Test Methods

Peel Force Test: An 1-inch (2.54 cm) wide by 6-inch (15.24 cm) strip of each test adhesive tape sample was placed on a 20 mil (0.05 cm) thick polypropylene plate. A 5-pound (2.27-kg) roller was then used to apply the tape to the plate assembly to insure uniform contact. Subsequently, an Imass Slip/Peel Tester model SP-102B-3M90 (Instrumentors Inc., Strongsville, Ohio) was used to measure a 180° peel force between the silicone adhesive and the polypropylene plate at a plate speed of 12 inches/minute (30.5 cm/minute), according to ASTM D3330-D3330M-96. An average peel force per inch of plate travel was registered on the tester. The test was repeated three times and average value reported in Newtons per decimeter (N/dm).

Release Force Test: A tape laminate, 1-inch (2.54 cm) wide by 6-inch (15.24 cm) long consisting of a tape backing, a layer of silicone adhesive, and a fluorosilicone coated release liner (CLPET-6J/000 available from Rexam Release Corporation, Bedford Park, Ill.) was adhered to the clean glass base plate of an Imass tester (Model SP-102B-3M90) with SCOTCH tape #411 (3M Company, St. Paul, Minn.). The 180° release force between release liner and silicone adhesive was measured at 30.5 cm/minute speed according to ASTM D3330-D3330M-9 by pulling the backing/adhesive laminate from the release liner. The average release force per inch of plate travel was registered on the tester and recorded. The experiment was repeated three times and average value reported in N/dm.

Cross Contamination Test: In a polystyrene 96-well microplate (available from Nalge International Corp, Naperville, Ill.) alternating wells were filled with approximately 50 µl of a red colorant solution (MERTHIOLATE, supplied by Eli Lilly, approximately 1:50 dilution in water) and the openings of the wells of the microplate were covered by the sample adhesive cover tapes. The covered plate was subsequently inverted and shaken several times. The wells in the plate were then visually observed to determine if the indicator solution had migrated to an adjacent well.

Solvent Resistance Test: Sample adhesive tapes were adhered to an aluminum plate with 6 wells, each well having a dimension of 0.6 cm diameter and 0.6 cm depth. Prior to application of the cover tape, DMSO (50 µl) was filled in each well and allowed to dwell for 24 hours in the tape-covered wells. The tapes were subsequently inspected visually for evidence of swelling or dissolution.

Extractables Test: Samples (4 cm×5 cm) of each adhesive cover tape were soaked in 5 ml of water or dimethyl sulfoxide (DMSO) for 24 hours. The sample adhesive tapes were also exposed to vapor phase contact with the solvents in the wells of the sample adhesive tape-covered aluminum plate described above for 7 days. The extracts were examined by gas chromatography/mass spectroscopy (GC/MS) using a Finnigan "Magnum" GC/ion trap mass spectrometer (available from Thermoquest Corporation, San Jose, Calif.) equipped with a model ZB-5 column (30 meters in length, 0.25 mm inner diameter, 0.1 µm film (available from Phenomenex Torrence, Calif.), a 4-ml Atas Optic 2 injector (available from Atas, Cambridge Cambridgeshire, United Kingdom), and a Finnegan scanning electron impact detector available from Thermoquest Corporation, San Jose, Calif. (electron impact scan range from 31 Daltons to 550 Daltons. The Atas injector was operated in a cold split, multi-capillary liner mode with a helium carrier gas flow rate of about 1 ml/minute. The injection temperature was programmed at 30° C./second to 350° C., the oven temperature was programmed to start from 50° C. incrementally ramping at 20° C./minute to a final temperature of 320° C. which was held for 2.5 minutes at the end of the run and the transfer line temperature was set at 300° C. The helium carrier gas pressure was programmed at 10 pounds per square inch (psi) initially to 20 psi after 16 minutes.

Residual Adhesive on Probe Puncture Test: Sample tapes of the noted compositions were adhered to a clear polystyrene 96-well nontreated microplate (No. 3367 available from Corning Inc., Corning, N.Y.). Each cover tape was punctured five consecutive times at different locations with either a 22 gauge needle or a 10 µl plastic tip (available from Eppendorf Corp., Germany). Subsequent to the puncture of each tape the barrel of the needles and the plastic tips were visually inspected (10× magnification) for evidence of adhesive residue adhering to these puncturing devices.

Rate of Sample Evaporation Test: A PCR (polymerase chain reaction) 96-well polypropylene Microamp Optical Plate, model N-8010560 (available from Pekin Elmer Biosystems Co., Norwalk, Conn.) was filled with 50 μl of solvent in each well. A test sample of an adhesive cover tape was then adhered to the Microamp optical plate covering the well openings. Weight loss due to evaporation of the water was monitored gravimetrically as a function of time at room temperatures (approximately 24° C.) over a period of 24 hours, to detect any change.

EXAMPLES 1–25

Materials

Dow Corning 7657 (available from Dow Coming Corporation, Midland, Mich.) silicone adhesive containing 56.5 parts silicone solids (44 wt % vinyldimethylsiloxane terminated polydimethylsiloxane with molecular weight approximately 500,000 and 56 wt % nonreactive MQ tacking resin) with xylene as the diluent. Additional amounts of the same nonreactive MQ tackifying resin were added by the manufacturer to the Dow Coming 7657 adhesive to provide adhesive solutions 7657-2, 7657-4, 7657-6, and 7657-8 containing 58, 60, 62, and 64 wt % MQ respectively. Toluene (available from Worum Chemical Company, St. Paul, Minn.) was added to each formulation to provide the adhesive at 40 wt % solids content for case of coating.

Dow Corning (Dow Coming Corporation, Midland, Mich.) SYL-OFF 7615 release modifier (designated as 7615) containing approximately 40 wt % dimethylvinylated and trimethylated silica; 57 wt % dimethylsiloxane, dimethylvinyl terminated with a degree of polymerization of 25; 1 wt % tetra(trimethylsiloxy) silane; 1 wt % of a Dow Coming proprietary ester; and a platinum-containing catalyst.

Dow Coming SYL-OFF 7678 cirosslinker (designated as 7678) containing dimethylsiloxane methylhydrogensiloxane copolymer.

Dow Coming SYL-OFF 4000 catalyst (designated as 4000) containing dimethylvinyl terminated polydimethylsiloxane, tetramethyldivinyldisiloxane, and a platinum siloxane complex.

Formulations

Adhesive Composition A: 250 parts of Dow Coming 7657 silicone base adhesive at 40% solids in toluene/xylene, and 1 part of SYL-OFF 4000 catalyst.

Adhesive Composition B: 250 parts of Dow Coming 7657-2 silicone base adhesive at 40% solids in toluene/xylene, and 1 part of SYL-OFF 4000 catalyst Adhesive Composition C: 250 pans of Dow Coming 7657-4 silicone base adhesive at 40% solids in toluene/xylene, and 1 part of SYL-OFF 4000 catalyst.

Adhesive Composition D: 250 parts of Dow Corning 7657-6 silicone base adhesive at 40% solids in toluene/xylene, and 1 part of SYL-OFF 4000 catalyst.

Adhesive Composition E: 250 parts of Dow Corning 7657-8 silicone base adhesive at 40% solids in toluene/xylene, and 1 part of SYL-OFF 4000 catalyst.

Modifier 7615: 93 parts of SYL-OFF 7615 release modifier and 7 parts of SYL-OFF 7678 crosslinker.

The silicone adhesives were prepared according to the formulations listed above in the proportions disclosed in Tables 1–5. Adhesive Compositions A–E were prepared by combining the above-listed components and mixing two to four hours on a roller at room temperature. Modifier 7615 was added to the Adhesive Compositions A–E and mixed on a roller at room temperature for an additional two to four hours to obtain homogeneous adhesive solutions for coating.

The resulting adhesive solution was applied on a release liner (CLPET-6J/000 transfer liner from Rexam Release Corp., Beford Park, Ill.) using a knife coater at 6–7 mils orifice, dried and cured by passing through a three-zone oven, at a rate of 3 feet/minute (0.914/meters/minute). The oven zone temperatures and residence times were 71° C. for 3 minutes, 82° C. for 3 minutes, and 82° C. for 6 minutes, respectively. A balance was then used to confirm an adhesive coating weight of approximately 0.768–0.896 grams per 154.8 cm square.

The silicone adhesive/release liner laminate was then laminated to an embossed tape backing, 0.01 cm thick, corona-treated ethylene/propylene copolymer (PP-PE) film (BPI Code #26379-3, Bloomer Plastics Inc., Bloomer, Wis.) by passing the adhesive/release liner laminate and embossed tape backing through a nip roll.

The peel force test and release force test were measured on each of the prepared samples and reported in Tables 1–5. The results suggest that there is little effect on the peel forces of the silicone tapes when 0–20 parts of silicone modifier were added to the silicone adhesive. Surprisingly, the results show that addition of silicone modifier serves to decrease release force without adversely affecting peel adhesion.

TABLE 1

Adhesive Composition A with 0, 5, 10, 15, and 20 parts of Modifier 7615

| Example | Modifier 7615 | Peel Force (N/dm) | Release Force (N/dm) |
|---|---|---|---|
| 1 | 0 part | 24.6 | 7.1 |
| 2 | 5 parts | 22.0 | 6.7 |
| 3 | 10 parts | 21.2 | 4.4 |
| 4 | 15 parts | 21.5 | 2.1 |
| 5 | 20 parts | 22.5 | 1.5 |

TABLE 2

Adhesive Composition B with 0, 5, 10, 15, and 20 parts of Modifier 7615

| Example | Modifier 7615 | Peel Force (N/dm) | Release Force (N/dm) |
|---|---|---|---|
| 6 | 0 part | 21.5 | 4.5 |
| 7 | 5 parts | 23.8 | 2.4 |
| 8 | 10 parts | 24.5 | 1.0 |
| 9 | 15 parts | 23.1 | 1.2 |
| 10 | 20 parts | 25.1 | 1.0 |

TABLE 3

Adhesive Composition C with 0, 5, 10, 15, and 20 parts of Modifier 7615

| Example | Modifier 7615 | Peel Force (N/dm) | Release Force (N/dm) |
|---|---|---|---|
| 11 | 0 part | 25.2 | 2.8 |
| 12 | 5 parts | 23.5 | 2.9 |
| 13 | 10 parts | 27.8 | 0.4 |
| 14 | 15 parts | 27.4 | 0.2 |
| 15 | 20 parts | 28.2 | 0.2 |

TABLE 4

Adhesive Composition D with 0, 5, 10, 15, and 20 parts of Modifier 7615

| Example | Modifier 7615 | Peel Force (N/dm) | Release Force (N/dm) |
|---|---|---|---|
| 16 | 0 part | 20.9 | 0.4 |
| 17 | 5 parts | 22.3 | 0.3 |
| 18 | 10 parts | 29.8 | 0.2 |
| 19 | 15 parts | 30.3 | 0.2 |
| 20 | 20 parts | 26.7 | 0.2 |

TABLE 5

Adhesive Composition E with 0, 5, 10, 15, and 20 parts of Modifier 7615

| Example | Modifier 7615 | Peel Force (N/dm) | Release Force (N/dm) |
|---|---|---|---|
| 21 | 0 part | 4.8 | 0.08 |
| 22 | 5 parts | 8.7 | 0.09 |
| 23 | 10 parts | 4.2 | 0.03 |
| 24 | 15 parts | 7.0 | 0.04 |
| 25 | 20 parts | 8.5 | 0.05 |

EXAMPLES 26–47 AND COMPARATIVE EXAMPLES C1–C5

Materials

Dow Corning 7657 silicone adhesive diluted to 40 wt % solids with toluene.

Vinyl Fluid A: a vinyldimethylsiloxane terminated polydimethylsiloxane fluid with degree of polymerization of 24.

Vinyl Fluid B: a vinyldimethylsiloxane terminated polydimethylsiloxane fluid with degree of polymerization of 67.

Vinyl Fluid C: a vinyldimethylsiloxane terminated polydimethylsiloxane fluid with degree of polymerization of 101.

Vinyl Fluid D: a vinyldimethylsiloxane terminated polydimethylsiloxane fluid with degree of polymerization of 167.

Vinyl Fluid E: a vinyldimethylsiloxane terminated polydimethylsiloxane fluid with degree of polymerization of 245.

Vinyl Fluid F: a vinyldimethylsiloxane terminated polydimethylsiloxane fluid with degree of polymerization of 459.

MQ resin solution: 63.4% nonreactive MQ resin (used in Dow Corning 7657 silicone adhesive) in xylene, provided by Dow Corning.

2EHHM: 2-ethylhexylhdrogen maleate was prepared by racting one mole of maleic anhydride with one mole of 2-ethyl-1-hexanol.

Formulations

Master batches of low molecular weight vinyl-substituted polydiorganosiloxanes ("vinyl-fluid" having varying degrees of polymerization) were prepared according to the following formulations.

| Master Batch | Vinyl Fluid | Vinyl Fluid Amount (g) | MQ resin solution (g) | SYL-OFF 7678 crosslinker (g) | 2EHHM (g) |
|---|---|---|---|---|---|
| A | A | 21.0 | 46.4 | 2.1 | 0.17 |
| B | B | 19.1 | 39.8 | 0.72 | 0.15 |
| C | C | 19.3 | 39.8 | 0.49 | 0.15 |
| D | D | 19.5 | 39.8 | 0.30 | 0.15 |
| E | E | 19.6 | 39.8 | 0.21 | 0.15 |
| F | F | 19.7 | 39.8 | 0.11 | 0.15 |

For each of the following examples, the proper amount of each Master Batch as indicated in Tables 6–11 was mixed with 50 grams of the 40% solids Dow Corning 7657 and 0.2 gm of SYL-OFF 4000. A tumbling roller was used for 2–4 hours to insure uniform mixing prior to coating.

The resulting adhesive solutions were applied an a release liner (CLPET-6J/000 transfer liner from Rexam Release, Bedford Park, Ill.) and coated, dried, and cured as in Examples 1–25, with the exception that oven zones 1, 2, and 3 were set at temperatures of 125° C., 149° C., and 149° C., respectively. The adhesive/release liner laminate was then laminated on a tape backing, BOPP (biaxially oriented polypropylene film) available from 3M Company, St. Paul, Minn. under the trade name SCOTCHPRO having a thickness of 31 μm (1.2 mils). The BOPP tape backing was corona-treated to enhance bonding of the silicone adhesive. The laminate of backing with adhesive and liner was constructed by passing the transfer tape and backing through a nip roll.

The peel force and release force of the tapes were measured utilizing the respective tests described above and reported in Tables 6–11. The release force for Example C1, which is the equivalent formulation to that of Example 1, has increased dramatically. This suggests that the fluorosilicone release liner (due to lot to lot variation) used for Tables 6–11 was less effective as compared with those in Tables 1–5. Nevertheless, the results in Examples 1–25 and Examples 26–47 confirm that adding low molecular weight silicone vinyl fluid (with or without reactive MQ resins) in the silicone adhesive formulations has a significant effect on lowering the release force of silicone adhesives from the release liner without adversely affecting peel adhesion. The data also suggest that a broad range of low molecular weight vinyl functional silicone fluids may be added in the silicone base adhesive with little effect on the peel forces of the silicone tapes.

TABLE 6

Coating Formulation with Vinyl Fluid A (DP = 24)

| Example | Master Batch | Master Batch Amount (g) | Amount of Vinyl Fluid A in Master Batch A (g) | Peel Force from PP (N/dm) | Release Force (N/dm) |
|---|---|---|---|---|---|
| C1 | A | 0 | 0.000 | 37.0 | 34.6 |
| 26 | A | 2.65 | 0.800 | 37.7 | 34.5 |
| 27 | A | 5.31 | 1.600 | 34.4 | 16.6 |
| 28 | A | 7.96 | 2.401 | 29.7 | 2.9 |
| 29 | A | 10.61 | 3.201 | 28.6 | 0.9 |
| 30 | A | 13.27 | 4.001 | 22.6 | 0.2 |
| 31 | A | 15.92 | 4.801 | 13.9 | 0.0 |

TABLE 7

Coating Formulation with Vinyl Fluid B (DP = 67)

| Example | Master Batch | Master Batch Amount (g) | Amount of Vinyl Fluid B in Master Batch B (g) | Peel Force from PP (N/dm) | Release Force (N/dm) |
|---|---|---|---|---|---|
| 32 | B | 7.96 | 2.543 | 28.9 | 16.6 |
| 33 | B | 10.61 | 3.391 | 25.9 | 11.4 |
| 34 | B | 13.27 | 4.239 | 22.5 | 8.5 |
| 35 | B | 15.92 | 5.087 | 21.2 | 6.7 |

TABLE 8

Coating Formulation with Vinyl Fluid C (DP = 101)

| Example | Master Batch | Master Batch Amount (g) | Amount of Vinyl Fluid C in Master Batch C (g) | Peel Force from PP (N/dm) | Release Force (N/dm) |
|---|---|---|---|---|---|
| 36 | C | 7.96 | 2.574 | 23.7 | 24.9 |
| 37 | C | 10.61 | 3.432 | 27.4 | 16.8 |
| 38 | C | 13.27 | 4.291 | 24.8 | 12.8 |
| 39 | C | 15.92 | 5.149 | 26.3 | 10.8 |

TABLE 9

Coating Formulation with Vinyl Fluid D (DP = 167)

| Example | Master Batch | Master Batch Amount (g) | Amount of Vinyl Fluid D in Master Batch D (g) | Peel Force from PP (N/dm) | Release Force (N/dm) |
|---|---|---|---|---|---|
| 40 | D | 7.96 | 2.599 | 30.4 | 27.2 |
| 41 | D | 10.61 | 3.466 | 27.9 | 23.5 |
| 42 | D | 13.27 | 4.332 | 26.5 | 18.2 |
| 43 | D | 15.92 | 5.199 | 23.3 | 16.5 |

TABLE 10

Coating Formulation with Vinyl Fluid E (DP = 245)

| Example | Master Batch | Master Batch Amount (g) | Amount of Vinyl Fluid E in Master Batch E (g) | Peel Force from PP (N/dm) | Release Force (N/dm) |
|---|---|---|---|---|---|
| 44 | E | 7.96 | 2.612 | 28.6 | 31.5 |
| 45 | E | 10.61 | 3.483 | 27.1 | 26.6 |
| 46 | E | 13.27 | 4.353 | 26.3 | 24.4 |
| 47 | E | 15.92 | 5.224 | 26.1 | 21.6 |

TABLE 11

Coating Formulation with Vinyl Fluid F (DP = 459)

| Example | Master Batch | Master Batch Amount (g) | Amount of Vinyl Fluid F in Master Batch F (g) | Peel Force from PP (N/dm) | Release Force (N/dm) |
|---|---|---|---|---|---|
| C2 | F | 7.96 | 2.625 | 31.8 | 37.0 |
| C3 | F | 10.61 | 3.500 | 30.7 | 34.3 |
| C4 | F | 13.27 | 4.375 | 28.8 | 35.3 |
| C5 | F | 15.92 | 5.250 | 28.8 | 30.3 |

EXAMPLES 48–49 AND COMPARATIVES C6–C11

The silicone adhesive composition of Example 13 on a release liner (CLPET-6J/000 transfer liner from Rexam Release Corporation, Bedford Park, Ill.) was laminated with the following backings.

Example 48 used an embossed high density polyethylene designated as PE (Product No. B100NA from Bloomer Plastics, Bloomer, Wis.). The embossed film thickness was 101.6 μm (4 mils).

Example 49 used a biaxially-oriented polypropylene having a thickness of 30.5 μm (1.2 mil) and designated as BOPP available by the trade designation SCOTCHPRO from 3M Company, St. Paul, Minn.

In a polystyrene 96-well microplate (available from Nalge Nunc International Corp, Naperville, Ill.) alternating wells were filled with approximately 50 μl of a red colorant solution (MERTHIOLATE, supplied by Eli Lily, approximately 1:50 dilution in water) and the openings of the wells of the microplate were covered by the sample adhesive cover tapes of Examples 48 and 49. The covered plate was subsequently inverted and shaken several times. The wells in the plate were then visually observed that showed no indicator solution had migrated to an adjacent well.

Samples of the tapes of Examples 48 and 49 were applied over a 96-well polypropylene microplate (Cat. No. 3364 available from Corning Inc., Corning, N.Y.), with DMSO in the micro-wells, for 24 hours under ambient conditions. There was no noticeable change of adhesion of the cover tapes of the invention to the polypropylene plate. However, Comparative Example C6 consisting of a nitrile rubber adhesive tape labeled (Product Number SJ3101 available from Minnesota Mining and Manufacturing Co., St. Paul, Minn.) and Comparative Example C7 consisting of a PET backing adhesive tape (THINSEAL tape available from PGC Scientifics, Gaithersberg, Md.) each exhibited total loss of adhesion when exposed to the same test conditions, as shown in Table 12.

These same four cover tapes were adhered to a clear polystyrene 96well nontreated microplate (No. 3367 available from Coming Inc., Corning, N.Y.). Each cover tape was punctured five consecutive times at different locations with a 22 gauge needle. Subsequent to the puncture of each tape the barrel of the needles were visually inspected (10× magnification) for evidence of adhesive residue adhering to these puncturing devices. These results are shown in Table 12.

TABLE 12

DMSO Resistance of Silicone Tapes and Comparative Tapes

| Example | Tape Backing | Adhesion in DMSO (24 hours) | Residue 22 G Needle |
|---|---|---|---|
| 48 | HDPB | Ok* | No residue visible |
| 49 | BOPP | Ok* | No residue visible |
| C6 | SJ 3101 | Swollen, lost adhesion | No residue visible |
| C7 | THINSEAL | Swollen, lost adhesion | No residue visible |

*no noticeable change of adhesion.

Table 13 reports the extraction data obtained in the Extractables Test utilizing the GC/MS conditions listed above with several common solvents utilized within a typical bioanalytical lab when preparing sample that would be introduced to a multi-well aluminum plate and covered. Samples of the tapes were placed in DMSO, water and 80/20 acetonitrile/water mixture for 24 hours. Any extractable material was analyzed with GC/MS. The results indicated that no material was extracted from any of these tapes.

Comparative 8 was Corning cover tape (product number 3095) commercially available from Corning Corp., Corning, N.Y. Comparative 9 was product number 62367 cover tape available from Zymarlc Corp., Hopldnton, Mass. Comparative 10 was Costar product number 6569 cover tape available from Corning Costar Corp., Acton, Mass. Comparative 11 was Ultra-Plate cover tape available from Sagian Corporation, Indianapolis, Ind. Each of these cover tape samples were used as received. The results demonstrate a significant value of the present invention is the ability of cover tapes of the present invention to resist commonly used solvents in bioanalytical applications.

TABLE 13

Tape Extraction Data by GC/MS with several common solvents for 24 hours

| Example | Tape/ PSA | DMSO ($''$g/cm$^2$ total extractants) | 80/20 AN*/H$_2$O ($''$g/cm$^2$ total extractants) | Water ($''$g/cm$^2$ total extractants |
|---|---|---|---|---|
| 49 | Silicone | <5 | N.T. | 0–1 |
| Comp. 8 | Corning 3095 | ~5,000** | ~5,000** | N.T. |
| Comp. 9 | Zymark P/N 62367 | ~5,000** | N.T. | N.T. |
| Comp. 10 | Costar 6569 | 15 | 7 | N.T. |
| Comp. 11 | Ultra-Plate | ~5,000* | N.T. | N.T. |

N.T. = not tested.
*AN = acetonitrile.
**Indicates that sample fully dissolved in extractant and exceeded the measurable range of the instrument. Values were calculated by mass balance before and after extraction.

EVAPORATION RATES OF EXAMPLE 42 AND COMPE. 12

Table 14 compares the evaporation rate of water in 24 hours for cover tapes applied to a Perkin Elmer PCR 96-well plate. The tapes consisted oif the silicone cover tape of Example 42 having a peel adhesion around 27 N/dm, and Comparative Example 12, CYCLE SEAL cover tape (by Robbins Scientific Corp., Sunnyvale, Calif.) having a peel adhesion less than 5 N/dm The data show that the silicone tape of the present invention provides a superior seal against the plate well as compared to a commercial cover tape having low peel adhesion.

TABLE 14

Evaporation Rates of Water in 24 Hours on a Perkin Elmer PCR 96-Well Plates

| Example | Samples | Evaporation/24 hr |
|---|---|---|
| 42 | BOPP with silicone PSA | ~3% |
| Comp 12 | Robbins (CYCLESEAL) 30 mils Thick, low peel | ~25% |

EVAPORATION RATES OF EXAMPLE 50 AND COMP. 13–15

Example 50 utilized the adhesive of Example 42 and a 3-layer (A/B/A) coextruded film for the adhesive tape backing, where outerlayer A (thickness=7 microns) was FINA polypropylene #3825 (available from FINA Oil & Chemical Co., Dallas, Tex.) and B is KRATON G1657 (available from Shell Chemical, Houston, Tex.) (thickness= 63 microns). The films were prepared on a coextrusion line using a Cloeren (Orange, Texas) ABBBC feedblock. The B Layer (elastic core) was split into three layers in the feedblock, recombined and sandwiched between the two skin layers to form the three-layer coextruded film. The A Layer (skin 1) was cast against a rubber nip roll. The C Layer (skin 2) was cast against a patterned steel chill roll. Extruder A (skin 1) was a 2.5-inch single screw (24:1 L/D) manufactured by David Standard Corporation (Pawcatuck, Conn.). Extruder B (elastic core) was a 2.5-inch single screw (32:1) manufactured by Extruders Inc. and Extruder C (skin 2) was a 1.5-inch single screw (24:1 L/D) manufactured by David Standard.

Comparative Examples 13 and 14 were commercially available adhesive tapes. Aluminum adhesive tape (Comp. 13, from Marsh Biomedical Products, Inc., Rochester, N.Y.) and a PET adhesive tape (Comp. 14, trade name THINSEAL from PGC Scientifics, Gaithersburg, Md.) were used for comparison. Comparative 15 was an open will (without a cover tape).

After removing the release liner from the tapes of Example 50 and Comparatives 13 and 14, they were used as cover tapes to seal a 96-well polypropylene Microamp Optical Plate, model N-8010560 (available from Perkin Elmer Biosystems Co., Norwalk, Conn.) filled with 50 $\mu$l of water in each well.

In a first experiment, the adhesive cover taped microplate of Example 50 was inverted with the adhesive in contact with the openings of the microwells. The tape of Example 50 was then pierced several times using an 18-gauge stainless steel needle of a hypodermic syringe to facilitate removal of water from selected micro-wells. After withdrawing the needle, and inverting the microplate, there was no visual evidence of leakage from any micro-well covered with the tape of Example 50. It should also be noted that after completing the penetration test, there was no evidence of adhesive residue on the surface of the probe used to pierce the cover tape of Example 50.

In a second experiment, the cover tapes of each of Examples 50 and Comparatives 13 and 14 were pierced with a 22-gauge needle at room conditions. Table 15 shows the evaporation rates of the pierced cover tapes of this second experiment applied to the surface of a 96-well polypropylene Microamp Optical Plate, model N-8010560 (available from Perkin Elmer Biosystems Co., Norwalk, Conn.) filled with representative solvents. The solvents covered by the tapes were acetonitrile/water (84:16 by wt), water, and DMSO. For Example 50, loss by evaporation was minimal and no leakage was detected after shaking the plate vigorously, as compared to Comparatives 13 and 14. The negative value for Example 50 with DMSO appears to be due to sorption of moisture by DMSO at room condition. Comparative 15 showed the evaporation rate of the solvent without a cover tape.

TABLE 15

Effect of A Septum Tape Backing on the Evaporation Rates of Some Commonly Used Solvents

| Example | Solvents | Evaporation/hr |
|---|---|---|
| 50 | Acetonitrile:Water (84:16 by wt). | 0.12% |
| 50 | Water | 0.02% |
| 50 | DMSO | -0.02% |
| Comp 13 | Acetonitrile:Water (84:16 by wt). | 0.75% |
| Comp 14 | Acetonitrile:Water (84:16 by wt). | 1.10% |
| Comp 15* | Acetonitrile:Water (84:16 by wt). | 29% |

*No cover tape

Peel Force of Cover Tapes from Nitrile Rubber

Peel force of adhesive tapes from a nitrile rubber surface (type: N-DEX 60005 PFM powders free, Best Manufacturing Co., Menio, Ga.) were measured using the Peel Force Test described above, except a portion of a nitrile rubber glove was adhered to the polypropylene plate with SCOTCH tape #411 (3M Companty, St. Paul, Minn.). The data is shown in Table 16 for the cover tapes of Examples 11–15 and Comparative 14. The silicone tapes in this invention have very low peel adhesion to the commonly used rubber gloves. Furthermore, the silicone tapes have very low tack when touched with fingers or rubber gloves.

TABLE 16

Peel Adhesion of Tapes on Nitrile Rubber Glove Surfaces

| Example | Peel Adhesion (N/dm) |
|---|---|
| Example 11 | 2.2 |
| Example 12 | 1.7 |
| Example 13 | 0 |
| Example 14 | 0 |
| Example 15 | 0 |
| Comp. 14 | 19.0 |

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. An adhesive prepared from components comprising:
   (a) a polydiorganosiloxane having the general formula $R^1R_2SiO(R_2SiO)_nSiR_2R^1$ and a number average molecular weight of at least 20,000, wherein each R is independently a monovalent hydrocarbon group, each $R^1$ is independently an alkenyl group, and n is an integer;
   (b) a polydiorganosiloxane having the general formula $R^1R_2SiO(R_2SiO)_m(R^1RSiO)_nSiR_2R^1$ and a number average molecular weight of less than 20,000, wherein each R and $R^1$ is independently a monovalent hydrocarbon group at least two $R^1$ groups are alkenyl groups, and m and n are integers the sum of which provide an alkenyl equivalent weight of about 250 to about 10,000;
   (c) an organopolysiloxane MQ resin which contains $(R^2)_3SiO_{1/2}$ units and $SiO_2$ units in a molar ratio in the range of 0.6:1 to 1:1, wherein each $R^2$ is independently selected from the group of alkyl groups, alkenyl groups, or hydroxyl groups, wherein at least 95 mole percent of all $R^2$ groups are methyl groups;
   (d) an organohydrogenpolysiloxane free of aliphatic unsaturation having an average of at least 2 silicon-bonded hydrogen atoms in each molecule, in a quantity sufficient to provide from 1 to 40 silicon-bonded hydrogen atoms per alkenyl group in components (a) through (c); and
   (e) a Group VIIB-containing catalyst in a quantity sufficient to provide 0.1 to 1,000 weight parts Group VIIIB metal for each one million weight parts of the combined quantity of components (a) through (d);
wherein when the adhesive is disposed on a propylene/ethylene copolymer backing at a coating weight of 0.8 grams/154.8 cm² and adhered to a polypropylene plate displays a 180° peel force of at least about 5 N/dm when measured at 30.5 cm/minute and room temperature.

2. The adhesive of claim 1 wherein the organopolysiloxane MQ resin includes both nonfunctional and functional MQ resins.

3. The adhesive of claim 2 wherein the functional MQ resin includes alkenyl groups.

4. An adhesive prepared from components comprising:
   (a) a polydiorganosiloxane having the general formula $R^1R_2SiO(R_2SiO)_nSiR_2R^1$ and a number average molecular weight of at least 20,000, wherein each R is independently a monovalent hydrocarbon group, each $R^1$ is independently an alkenyl group, and n is an integer;
   (b) a polydiorganosiloxane having the general formula $R^1R_2SiO(R_2SiO)_m(R^1RSiO)_nSiR_2R^1$ and a number average molecular weight of less than 20,000, wherein each R and $R^1$ is independently a monoyalent hydrocarbon group, at least two $R^1$ groups are alkenyl groups, and m and n are integers the sum of which provide an alkenyl equivalent weight of about 250 to about 10,000;
   (c) an organopolysiloxane MQ resin which contains $(R^2)_3SiO_{1/2}$ units and $SiO_2$ units in a molar ratio in the range of 0.6:1 to 1:1, wherein each $R^2$ is independently selected from the group of alkyl groups, alkenyl groups, or hydroxyl groups, wherein at least 95 mole percent of all $R^2$ groups are methyl groups;
   (d) an organohydrogenpolysiloxane free of aliphatic unsaturation having an average of at least 2 silicon-bonded hydrogen atoms in each molecule, in a quantity sufficient to provide from 1 to 40 silicon-bonded hydrogen atoms per alkenyl group in component (a) through (c); and
   (e) a Group VIIIB-containing catalyst in a quantity sufficient to provide 0.1 to 1,000 weight parts Group VIIIB mental for each one million weight parts of the combined quantity of components (a) through (d);
wherein when the adhesive is disposed on a fluorosilicone-coated polyethylene terephthalate release liner and a propylene/ethylene copolymer backing at a coating weight of 0.8 grams/154.8 cm² to form a laminate, and when adhered to a glass plate, displays a 180° release force of no grater than about 20 N/dm when measured at 30.5 cm/minute and room temperature.

5. The adhesive of claim 4 which displays a release force of no greater than about 15 N/dm.

6. The adhesive of claim 5 which displays a release force of no greater than about 10 N/dm.

7. The adhesive of claim 6 which displays a release force of no greater then about 5 N/dm.

8. The adhesive of claim 4 when disposed on a propylene/ethylene copolymer backing at a coating weight of 0.8 grams/154.8 cm² and adhered to a polypropylene plate displays a 180° peel force of at least about 5 N/dm when measured at 30.5 cm/minute and room temperature.

9. The adhesive of claim 1 which is a pressure sensitive adhesive.

10. An adhesive article comprising a substrate having disposed on at least one major surface the silicone-based adhesive of claim 1.

11. The adhesive article of claim 10 wherein the organopolysiloxane MQ resin includes both nonfunctional and functional MQ resins.

12. The adhesive article of claim 10 further comprising a release line disposed on the adhesive.

13. An adhesive article comprising a substrate having disposed on at least major surface the silicone-based adhesive of claim 4.

14. The adhesive article of claim 13 wherein the adhesive displays a release force of no greater than about 5 N/dm.

15. The adhesive article of claim 13 wherein the adhesive when disposed on a propylene/ethylene copolymer backing at a coating weight of 0.8 grams/154.8 cm$^2$ and adhered to a polypropylene plate displays a 180° peel force of at least about 5 N/dm when measured at 30.5 cm/minute and room temperature.

16. The adhesive article of claim 10 wherein the substrate comprises a puncturable material.

17. The adhesive article of claim 10 wherein the adhesive is a pressure sensitive adhesive.

18. An analytical receptacle comprising a surface and a cover tape adhered to the surface; wherein the cover tape comprises a backing and the adhesive of claim 1 disposed on at least one major surface of the backing and in contact with the receptacle surface.

19. The analytical receptacle of claim 18 further comprising one or more reservoirs in the form of a well or channel.

20. The analytical receptacle of claim 18 wherein the analytical receptacle comprises a substantially continuous tape.

21. The analytical receptacle of claim 18 wherein the adhesive is a pressure sensitive adhesive.

22. An analytical receptacle comprising a surface and a cover tape adhered to the surface; wherein the cover tape comprises a backing, and the adhesive of claim 4 disposed on at least one major surface of the backing and in contact with the receptacle surface.

23. The analytical receptacle of claim 22 wherein the adhesive display a release force of no greater than about 5 N/dm.

24. The analytical receptacle of claim 22 wherein the adhesive when disposed on a propylene/ethylene copolymer backing at a coating weight of 0.8 grams/154.8 cm$^2$ and adhered to a polypropylene plate displays a 180° peel force of at least about 5 N/dm when measured at 30.5 cm/minute and room temperature.

25. The analytical receptacle of claim 18 further comprising one or more reservoirs including a liquid therein during use.

26. The analytical receptacle of claim 25 wherein the liquid comprises dimethyl sulfoxide, water, acetonitrile/water, methanol, ethanol, or mixtures thereof.

27. The analytical receptacle of claim 18 comprising a microtiter plate.

28. The analytical receptacle of claim 18 comprising a microfluidic device comprising a substrate and one or more channels therein.

29. The analytical receptacle of claim 18 comprising a substantially continuous polymeric strip comprising a plurality of reservoirs at predetermined intervals along its length.

30. The analytical receptacle of claim 29 wherein the reservoirs are uniformly spaced.

31. An analytical receptacle comprising a surface comprising polypropylene,polystyrene, or combination thereof, and a cover tape adhered to the surface; wherein the cover tape comprises a backing and an adhesive disposed on at least one major surface of the backing and in contact with the receptacle surface, wherein the adhesive is prepared from components comprising:
 (a) a polydiorganosiloxane having the general formula $R^1R_2SiO(R_2SiO)_nSiR_2R^1$ wherein each R is independently a monovalent hydrocarbon group, each $R^1$ is independently an alkenyl group and n is an integer;
 (b) an organopolysiloxane MQ resin which contains $(R^2)_3SiO_{1/2}$ units and $SiO_2$ units in a molar ratio in the range of 0.6:1 to 1:1, wherein each $R^2$ is independently selected from the group of alkyl groups, alkenyl groups, or hydroxyl groups, wherein at least 95 mole percent of all $R^2$ groups are methyl groups;
 (c) an organohydrogenpolysiloxane free of aliphatic unsaturation having an average of at least 2 silicon-bonded hydrogen atoms in each molecule, in a quantity sufficient to provide from 1 to 40 silicon-bonded hydrogen atoms per alkenyl group in component (a) and component (b) if present; and
 (d) a Group VIIIB-containing catalyst in a quantity sufficient to provide 0.1 to 1,000 weight parts Group VIIIB metal for each one million weight parts of the combined quantity of components (a) through (c);
wherein when the adhesive is disposed on a propylene/ethylene copolymer backing at a coating weight of 0.9 grams/154.8 cm$^2$ and adhered to a polypropylene plate displays a 180° peel force of at least about 5 N/dm when measured at 30.5 cm/minute and room temperature.

32. An analytical receptacle comprising a surface and a cover tape adhered to the surface; wherein the cover tape comprises a backing and an adhesive disposed on at least one major surface of the backing and in contact with the a receptacle surface, wherein the adhesive is prepared from components comprising:
 (e) a polydiorganosiloxane having the general formula $R^1R_2SiO(R_2SiO)_nSiR_2R^1$ wherein each R is independently a monovalent hydrocarbon group, each $R^1$ is independently an alkenyl group and n is an integer;
 (f) an organopolysiloxane MQ resin which contains $(R^2)_3SiO_{1/2}$ units and $SiO_2$ units in a molar ratio in the range of 0.6:1 to 1:1, wherein each $R^2$ is independently selected from the group of alkyl groups, alkenyl groups, or hydroxyl groups, wherein at least 95 mole percent of all $R^2$ groups are methyl groups;
 (g) an organohydrogenpolysiloxane free of aliphatic unsaturation having an average of at least 2 silicon-bonded hydrogen atoms in each molecule, in a quantity sufficient to provide from 1 to 40 silicon-bonded hydrogen atoms per alkenyl group in component (a) and component (b) if present; and
 (h) a Group VIIIB-containing catalyst in a quantity sufficient to provide 0.1 to 1,000 weight parts Group VIIIB metal for each one million weight parts of the combined quantity of components (a) through (c);
wherein the adhesive when disposed on a fluorosilicone-coated polyethylene terephthalate release liner and a propylene/ethylene copolymer baking at a coating weight of 0.8 grams/154.8 cm$^2$ to form a laminate, and when adhered to a glass plant, displays a 180° release force of no greater than about 20 N/dm when measured at 30.5 cm/minute and room temperature.

33. A method of making an adhesive comprising:
 preparing a composition comprising:
 (a) a polydiorganosiloxane having the general formula $R^1R_2SiO(R_2SiO)_nSiR_2R^1$ and a number average molecular weight of at last 20,000, wherein each R is independently a monovalent hydrocarbon group, each $R^1$ is independently an alkenyl group, and n is an integer;
 (b) a polydiorganosiloxane having the general formula $R^1R_2SiO(R_2SiO)_m(R^1R_2SiO)_nSiR_2R^1$ and a number average molecular weight of less than 20,000, wherein each R and $R^1$ is independently a monovalern hydrocarbon group, at least two $R^1$ groups are alkenyl groups, and m and n are integers the sum of which provide an alkenyl equivalent weight of about 250 to about 10,000;

(c) an organopolysiloxane MQ resin which contains $(R^2)_3SiO_{1/2}$ units and $SiO_2$ units in a molar ratio in the range of 0.6:1 to 1:1, wherein each $R^2$ is independently selected from the group of alkyl groups, alkenyl groups, or hydroxyl groups, wherein at least 95 mole percent of all $R^2$ groups are methyl groups;

(d) an organohydrogenpolysiloxane free of aliphatic unsaturation having an average of at least 2 silicon-bonded hydrogen atoms in each molecule, in a quantity sufficient to provide from 1 to 40 silicon-bonded hydrogen atoms per alkenyl group in components (a) through (c); and (e) a Group VIIIB-containing catalyst in a quantity sufficient to provide 0.1 to 1,000 weight parts Group VIIIB metal for each one million weight parts of the combined quantity of components (a) through (d); and thermally curing the composition;

wherein when the adhesive is disposed on a propylene/ethylene copolymer backing at a coating weight of 0.8 grams/154.8 cm² and adhered to a polypropylene plate displays a 180° peel force of at least about 5 N/dm when measured at 30.5 cm/minute and room temperature.

34. A method of sealing an analytical receptacle comprising applying a cover tape comprising a backing and the adhesive of claim 1 disposed on at least one major surface thereof.

35. An analytical receptacle comprising a surface comprising polypropylene, polystyrene, or combination thereof, and a cover tape adhered to the surface, wherein the cover tape comprises a backing and an adhesive disposed on at leat one major surface of the backing and in contact with the receptacle surface, wherein the adhesive is prepared from components comprising:

(i) a polydiorganosiloxane having the general formula $R^1R^2SiO(R_2SiO)_nSiR_2R^1$ wherein each R is independently a monovalent hydrocarbon group, each $R^1$ is independently an alkenyl group and n is an integer, (j) an organopolysiloxane MQ resin which contains $(R^2)_3SiO_{1/2}$ units and $SiO_2$ units in a molar ratio in the range of 0.6:1 to 1:1, wherein each $R^2$ is independently selected from the group of alkyl groups, alkenyl groups, or hydroxyl groups, wherein at least 95 mole percent of all $R^2$ groups are methyl groups;

(k) an organohydrogenpolysiloxane free of aliphatic unsaturation having an average of at least 2 silicon-bonded hydrogen atoms in each molecule, in a quantity sufficient to provide from 1 to 40 silicon-bonded hydrogen atoms per alkenyl group in component (a) and component (b) if present; and (l) a Group VIIIB-containing catalyst in a quantity sufficient to provide 0.1 to 1,000 weight parts Group VIIIB metal for each one million weight park of the combined quantity of components (a) through (c);

wherein the adhesive when disposed on a fluorosilicone-coated polyethylene terephthalate release liner and a propylene/ethylene copolymer backing at a coating weight of 0.8 grams/154.8 cm² to form a laminate, and when adhered to a glass plate, displays a 180° release force of no greater than about 20 N/dm when measured at 30.5 cm/minute and room temperature.

36. An analytical receptacle comprising a surface and a cover tape adhered to the surface; wherein the cover tape comprises a backing and an adhesive disposed on at least one major surface of the backing and in contact with the receptacle surface, wherein the adhesive is prepared from components comprising:

(m) a polydiorganosiloxane having the general formula $R^1R_2SiO(R_2SiO)_nSiR_2R^1$ wherein each R is independently a monovalent hydrocarbon group, each $R^1$ is independently an alkenyl group and n is an integer, (n) an organopolysiloxane MQ resin which contains $(R^2)_3SiO_{1/2}$ units and $SiO_2$ units in a molar ratio in the range of 0.6:1 to 1:1, wherein each $R^2$ is independently selected from the group of alkyl groups, alkenyl groups, or hydroxyl groups, wherein at least 95 mole percent of all $R^2$ groups are methyl groups;

(o) an organohydrogenpolysiloxane free of aliphatic unsaturation having an average of at least 2 silicon-bonded hydrogen atoms in each molecule, in a quantity sufficient to provide from 1 to 40 silicon-bonded hydrogen atoms per alkenyl group in component (a) and component (b) if present; and (p) a Group VIIIB-containing catalyst in quantity sufficient to provide 0.1 to 1,000 weight parts Group VIIIB metal for each one million weight parts of the combined quantity of components (a) though (c);

wherein when the adhesive is disposed on a propylene/ethylene copolymer backing at a coating weight of 0.8 grams/154.8 cm² and adhered to a polypropylene plate display a 180° peel fore of at least about 5 N/dm when measured at 30.5 cm/minute and room temperature.

37. A method of making an adhesive comprising:

preparing a composition comprising:

(f) a polydiorganosiloxane having the general formula $R^1R_2SiO(R_2SiO)_mSiR_2R^1$ and a number average molecular weight of at least 20,000, wherein each R is independently a monovalent hydrocarbon group, each $R^1$ is independently an alkenyl group, and n is an integer, (g) a polydiorganosiloxane having the general formula $R^1R_2SiO(R_2SiO)_m(R^1R_2SiO)_nSiR_2R^1$ and a number average molecular weight of less than 20,000, wherein each R and $R^1$ is independently a monovalent hydrocarbon group, at least two $R^1$ groups are alkenyl groups, and m and n are integers the sum of which provide an alkenyl equivalent weight of about 250 to about 10,000;

(h) an organopolysiloxane MQ resin which contains $(R^2)_3SiO_{1/2}$ units and $SiO_2$ units in a molar ratio in the range of 0.6:1 to 1:1, wherein each $R^2$ is independently selected from the group of alkyl groups, alkenyl groups, or hydroxyl groups, wherein at least 95 mole percent of all $R^2$ groups are methyl groups;

(i) an organohydrogenpolysiloxane free of aliphatic unsaturation having an average of at least 2 silicon-bonded hydrogen atoms in each molecule, in a quantity sufficient to provide from 1 to 40 silicon-bonded hydrogen atoms per alkenyl group in components (a) through (c); and (j) a Group VIIIB-containing catalyst in a quantity sufficient to provide 0.1 to 1,000 weight parts Group VIIIB metal for each one million weight parts of the combined quantity of components (a) through (d); and thermally curing the composition;

wherein the adhesive when disposed on a fluorosilicone-coated polyethylene terephthalate release liner and a propylene/ethylene copolymer backing at a coating weight of 0.8 grams/154.8 cm² to form a laminate, and when adhered to a glass plate, displays a 180° release force of no greater than about 20 N/dm when measured at 30.5 cm/minute and room temperature.

38. A method of sealing an analytical receptacle comprising applying a cover tape comprising a backing and the adhesive of claim 4 disposed on at last one major surface thereof.

* * * * *

UNITED STATES PATENT AND TRADEMARK OFFICE
CERTIFICATE OF CORRECTION

PATENT NO. : 6,703,120 B1
DATED : March 9, 2004
INVENTOR(S) : Ko, John H.

It is certified that error appears in the above-identified patent and that said Letters Patent is hereby corrected as shown below:

Title page,
Item [56], References Cited, OTHER PUBLICATIONS, "Information About *Syl-Off©* 4000 catalyst" reference, delete "Syl-Off©" and insert -- Syl-Off® --, therefor.

Column 1,
Line 29, delete "tan" and insert -- than --, therefor.
Line 67, delete "multiplayer" and insert -- multilayer --, therefor.

Column 2,
Line 3, delete "2 mils. To" and insert -- 2 mils to --, therefor.
Line 4, after "low" insert -- tack --.
Line 10, after "adhesive" insert -- tape --, therefor.
Line 30, delete "arm" and insert -- are --, therefor.

Column 3,
Line 28, after "integer" delete "," and insert -- ; --, therefor.
Line 45, after "VIIIB" insert -- - --.

Column 4,
Lines 8 and 32, after "integer" delete "," and insert -- ; --, therefor.
Line 45, delete "minion" and insert -- million --, therefor.

Column 5,
Line 54, delete "arc" and insert -- are --, therefor.

Column 7,
Line 10, delete "Coming" and insert -- Corning --, therefor.
Line 23, delete "$R^1R^2SiO$" and insert -- $R^1R_2SiO$ --, therefor.
Line 26, after "integer" delete "," and insert -- ; --, therefor.
Line 65, delete "180° C." and insert -- 180° --, therefor.

Column 8,
Line 9, delete "180" and insert -- 180° --, therefor.
Line 34, delete "prefered" and insert -- preferred --, therefor.
Line 51, after "integer" delete "," and insert -- ; --, therefor.

Column 9,
Line 9, delete "VIIB" and insert -- VIIIB --, therefor.
Line 37, delete "pails" and insert -- parts --, therefor.

UNITED STATES PATENT AND TRADEMARK OFFICE
CERTIFICATE OF CORRECTION

PATENT NO. : 6,703,120 B1
DATED : March 9, 2004
INVENTOR(S) : Ko, John H.

It is certified that error appears in the above-identified patent and that said Letters Patent is hereby corrected as shown below:

Column 10,
Lines 1 and 42, delete "Coming" and insert -- Corning --, therefor.

Column 11,
Line 36, delete "compose" and insert -- comprise --, therefor.

Column 13,
Line 3, delete "Pekin" and insert -- Perkin --, therefor.
Line 9, delete "temperatures" and insert -- temperature --, therefor.
Lines 15, 22, 28, 33, 36, 39, 45, 48 and 51, delete "Coming" and insert
-- Corning --, therefor.
Lines 19-20, delete "tacking" and insert -- tackifying --, therefor.
Line 27, delete "case" and insert -- ease --, therefor.
Line 36, delete "cirosslinker" and insert -- crosslinker --, therefor.
Line 50, after "catalyst" insert -- . --.
Line 51, delete "pans" and insert -- parts --, therefor.

Column 14,
Line 8, after "0.914" delete "/".

Column 15,
Lines 33, 56 and 57, delete "Coming" and insert -- Corning --, therefor.
Line 58, delete "2-ethylhexylhdrogen" and insert -- 2-thylhexylhydrogen --, therefor.
Line 59, delete "racting" and insert -- reacting --, therefor.

Column 16,
Line 20, delete "an" and insert -- on --, therefor.

Column 18,
Line 37, after "96" insert -- - --.
Line 38, delete "Coming" and insert -- Corning --, therefor.

Column 19,
Line 1, delete "Coming" and insert -- Corning --, therefor.
Line 4, delete "Zymarlc" and insert -- Zymark --, therefor.
Line 4, delete "Hopldnton" and insert -- Hopkinton --, therefor.
Line 20, Table 13, below "DMSO" delete "$^\mu$g/cm$^2$" and insert -- "$\mu$g/cm$^2$ --, therefor.
Line 20, Table 13, below "AN$^*$/H$_2$O" delete "$^\mu$g/cm$^2$" and insert -- "$\mu$g/cm$^2$ --, therefor.
Line 20, Table 13, below "Water" delete "$^\mu$g/cm$^2$" and insert -- "$\mu$g/cm$^2$ --, therefor.
Line 26, Table 13, delete "~5,000$^*$" and insert -- ~5,000$^{**}$ --, therefor.
Line 38, delete "oif" and insert -- of --, therefor.

UNITED STATES PATENT AND TRADEMARK OFFICE
CERTIFICATE OF CORRECTION

PATENT NO. : 6,703,120 B1
DATED : March 9, 2004
INVENTOR(S) : Ko, John H.

It is certified that error appears in the above-identified patent and that said Letters Patent is hereby corrected as shown below:

Column 21,
Line 4, delete "Companty" and insert -- Company --, therefor.
Line 23, delete "documnents" and insert -- documents --, therefor.
Line 23, delete "arc" and insert -- are --, therefor.
Line 46, after "group" insert -- , --.
Line 62, delete "VIIB" insert -- VIIIB --.

Column 22,
Line 19, delete "monoyalent" and insert -- monovalent --, therefor.
Line 34, delete "component" and insert -- components --, therefor.
Line 38, delete "mental" and insert -- metal --, therefor.
Line 45, delete "grater" and insert -- greater --, therefor.
Line 52, delete "then" and insert -- than --, therefor.

Column 22,
Line 67, delete "line" and insert -- liner --, therefor.

Column 23,
Line 2, after "least" insert -- one --.
Line 2, after "surface" insert -- of --.
Line 30, after "backing" delete ",".
Line 34, delete "display" and insert -- displays --, therefor.

Column 24,
Line 21, delete "0.9" and insert -- 0.8 --, therefor.
Line 28, after "the" delete "a".
Line 31, delete "(e)" and insert -- (a) --, therefor.
Line 35, delete "(f)" and insert -- (b) --, therefor.
Line 41, delete "(g)" and insert -- (c) --, therefor.
Line 47, delete "(h)" and insert -- (d) --, therefor.
Line 53, delete "baking" and insert -- backing --, therefor.
Line 55, delete "plant" and insert -- plate --, therefor.
Line 62, delete "last" and insert -- least --, therefor.

Column 25,
Lines 2-3, delete "monovalern" and insert -- monovalent --, therefor.
Line 36, after "surface" delete "," and insert -- ; --, therefor.
Line 37, delete "leat" and insert -- least --, therefor.
Line 41, delete "(i)" and insert -- (a) --, therefor.
Line 42, delete "$R^1R^2SiO$" and insert -- $R^1R_2SiO$ --, therefor.
Line 44, after "integer" delete "," and insert -- ; --, therefor.

UNITED STATES PATENT AND TRADEMARK OFFICE
CERTIFICATE OF CORRECTION

PATENT NO. : 6,703,120 B1
DATED : March 9, 2004
INVENTOR(S) : Ko, John H.

It is certified that error appears in the above-identified patent and that said Letters Patent is hereby corrected as shown below:

Column 25, (cont.)
Line 45, delete "(j)" and insert -- (b) --, therefor.
Line 51, delete "(k)" and insert -- (c) --, therefor.
Line 57, delete "(l)" and insert -- (d) --, therefor.
Line 59, delete "park" and insert -- parts --, therefor.

Column 26,
Line 7, delete "(m)" and insert -- (a) --, therefor.
Line 10, after "integer" delete "," and insert -- ; --, therefor.
Line 11, delete "(n)" and insert -- (b) --, therefor.
Line 17, delete "(o)" and insert -- (c) --, therefor.
Line 23, delete "(p)" and insert -- (d) --, therefor.
Line 23, after "in" insert -- a --.
Line 26, delete "though" and, insert -- through --, therefor.
Line 30, delete "display" and, insert -- displays --, therefor.
Line 30, delete "fore" and, insert -- force --, therefor.
Line 34, delete "(f)" and, insert -- (a) --, therefor.
Line 35, delete "$(R_2SiO)_m SiR_2R^1$" and, insert -- $(R_2SiO)_n SiR_2R^1$ --, therefor.
Line 39, after "integer" delete "," and, insert -- ; --, therefor.
Line 40, delete "(g)" and, insert -- (b) --, therefor.
Line 48, delete "(h)" and, insert -- (c) --, therefor.
Line 54, delete "(i)" and, insert -- (d) --, therefor.
Line 60, delete "(j)" and, insert -- (e) --, therefor.

Column 28,
Line 3, delete "last" and, insert -- least --, therefor.

Signed and Sealed this

Twenty-second Day of February, 2005

JON W. DUDAS
*Director of the United States Patent and Trademark Office*